US008112780B2

(12) United States Patent
Taura et al.

(10) Patent No.: US 8,112,780 B2
(45) Date of Patent: Feb. 7, 2012

(54) DIGITAL BROADCAST RECEIVING APPARATUS

(75) Inventors: Kenichi Taura, Tokyo (JP); Masayuki Ishida, Tokyo (JP); Nobuyoshi Okumura, Tokyo (JP); Tadatoshi Ohkubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 569 days.

(21) Appl. No.: 11/662,084

(22) PCT Filed: Sep. 9, 2005

(86) PCT No.: PCT/JP2005/016648
§ 371 (c)(1),
(2), (4) Date: Mar. 7, 2007

(87) PCT Pub. No.: WO2006/061932
PCT Pub. Date: Jun. 15, 2006

(65) Prior Publication Data
US 2008/0098439 A1 Apr. 24, 2008

(30) Foreign Application Priority Data
Dec. 7, 2004 (JP) ................................. P2004-354453

(51) Int. Cl.
*H04N 7/18* (2006.01)
(52) U.S. Cl. .............. 725/75; 725/76; 725/85; 725/100; 725/110; 725/131; 725/139; 725/151
(58) Field of Classification Search .................. 725/75, 725/76, 78, 85, 100, 110, 131, 139, 151
See application file for complete search history.

(56) References Cited

U.S. PATENT DOCUMENTS

| 5,812,673 | A | * | 9/1998 | Nohara et al. | 455/222 |
|---|---|---|---|---|---|
| 6,115,419 | A | * | 9/2000 | Meehan | 375/233 |
| 6,405,372 | B1 | * | 6/2002 | Kim et al. | 725/50 |
| 6,772,434 | B1 | * | 8/2004 | Godwin | 725/110 |
| 7,124,426 | B1 | * | 10/2006 | Tsuria et al. | 725/76 |
| 7,146,627 | B1 | * | 12/2006 | Ismail et al. | 725/47 |
| 7,219,367 | B2 | * | 5/2007 | Briggs | 725/139 |
| 7,313,748 | B2 | * | 12/2007 | Cucchi | 714/760 |
| 7,369,823 | B2 | * | 5/2008 | Oiwa | 455/135 |
| 7,373,650 | B1 | * | 5/2008 | Rodriguez et al. | 725/41 |
| 7,409,140 | B2 | * | 8/2008 | Rodriguez et al. | 725/59 |
| 2002/0115436 | A1 | * | 8/2002 | Howell et al. | 455/426 |
| 2002/0163593 | A1 | * | 11/2002 | Liu et al. | 348/614 |

(Continued)

FOREIGN PATENT DOCUMENTS

JP    4-267635 A    9/1992

(Continued)

*Primary Examiner* — Brian Pendleton
*Assistant Examiner* — Nnenna Ekpo
(74) *Attorney, Agent, or Firm* — Birch Stewart Kolasch & Birch, LLP

(57) ABSTRACT

A digital broadcast receiving apparatus has two systems as a receiving system: a first receiving demodulation section including a first tuner 2 and the like; and a second receiving demodulation section including a second tuner 5 and the like. A controller 19 establishes either a first receiving mode or second receiving mode. In the first receiving mode, both the receiving systems receive the broadcasting waves of the same station to be viewed according to the signals from a vehicle speed detecting section 15 and receiving level detecting sections 16 and 17. In the second receiving mode, one of the two receiving systems receives the broadcasting wave of the station to be viewed, and the other of them receives the broadcasting wave of another station.

5 Claims, 5 Drawing Sheets

U.S. PATENT DOCUMENTS

| | | | |
|---|---|---|---|
| 2004/0261112 A1* | 12/2004 | Hicks et al. | 725/89 |
| 2005/0086694 A1* | 4/2005 | Hicks et al. | 725/79 |
| 2005/0144646 A1* | 6/2005 | Lecrom et al. | 725/100 |

FOREIGN PATENT DOCUMENTS

| | | | |
|---|---|---|---|
| JP | 9-36843 A | | 2/1997 |
| JP | 9-139655 A | | 5/1997 |
| JP | 9-163260 A | | 6/1997 |
| JP | 10-257404 A | | 9/1998 |
| JP | 2000-270277 | * | 3/1999 |
| JP | 2000-332665 A | | 11/2000 |
| JP | 2002-101029 A | | 4/2002 |
| JP | 2002-125158 A | | 4/2002 |
| JP | 2003-333441 A | | 11/2003 |
| JP | 2004-64590 A | | 2/2004 |
| JP | 2004-320406 A | | 11/2004 |

* cited by examiner

FIG.2
(a) 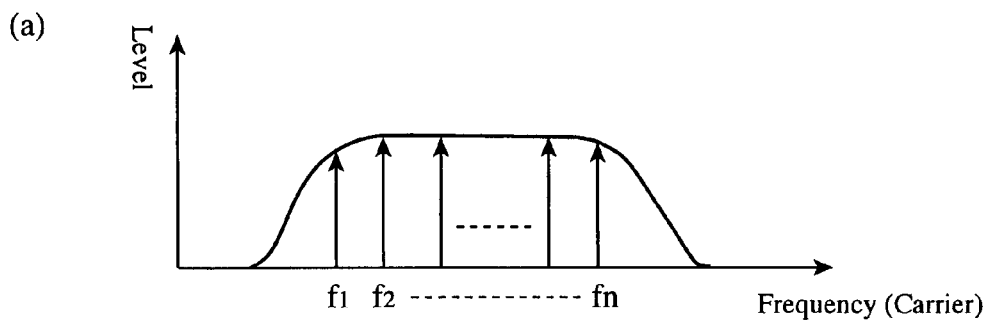
(b) 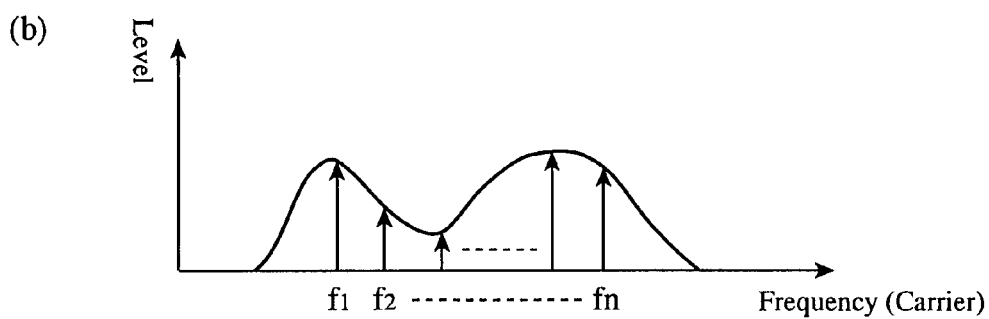
(c) 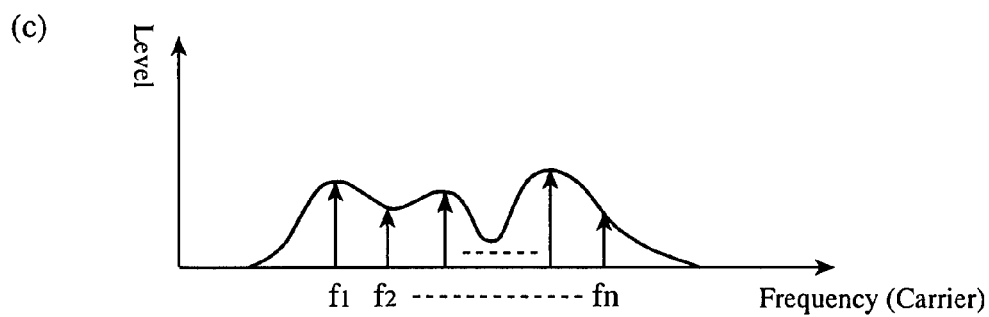
(d) 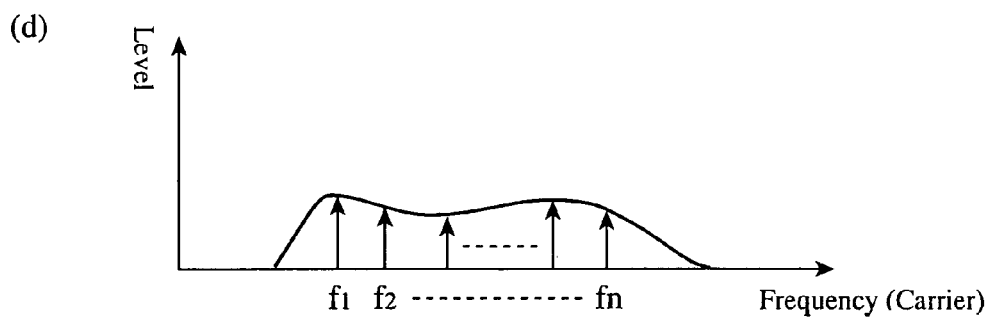

DIGITAL BROADCAST RECEIVING APPARATUS

TECHNICAL FIELD

The present invention relates to a digital broadcast receiving apparatus that is mounted on a mobile unit such as a vehicle, and has a diversity receiving function based on two receiving systems.

BACKGROUND ART

The terrestrial digital broadcasting that has started broadcasting recently employs orthogonal frequency division multiplexing (called OFDM from now on). It uses many carrier waves passing through multivalued digital modulation such as 64-valued quadrature amplitude modulation to carry out large volume data transmission such as Hi-Vision video transmission within a limited broadcasting frequency bandwidth.

To carry out mobile reception of the broadcasting based on this transmission scheme with a vehicle-mounted receiver or the like, it is known that a single receiving system can hardly achieve sufficient receiving quality by circumventing the adverse effect of the fading and the like. Accordingly, a diversity digital broadcast receiving apparatus having two or more receiving systems is employed as will be described below.

The conventional digital broadcast receiving apparatus has two sets of antennas, receiving demodulation sections and synthesizers and a decoding section and a control section. The conventional digital broadcast receiving apparatus causes the two synthesizers to output the same selection frequency signals at the normal communication; supplies the decoding section with the demodulation output from the receiving demodulation section having greater receiving field strength information between the two receiving demodulation sections; and causes, during vacant channel search or channel switching, one of the synthesizers to output the selection frequency signal of that channel in communication, and the other one of the synthesizers to output the selection frequency signal of the destination channel of the channel switching (see Patent Document 1, for example). In addition, when the first receiving apparatus that receives a terrestrial digital television broadcasting wave is started by user operation, the second receiving apparatus that receives a terrestrial digital radio broadcasting wave carries out the channel search and information separation. Thus, while the first receiving apparatus offers a television program to a user, the second receiving apparatus acquires information for receiving broadcasts to cope with changes in receiving areas. There is another system that switches, when the user instructs to switch in accordance with the area through a remote control transmitter or the like, the receiving frequency of the tuner of the first receiving apparatus in response to the broadcast receiving information about the area acquired by a CPU (see Patent Document 2, for example).

Patent Document 1: Japanese patent application laid-open No. 9-36843/1997.

Patent Document 2: Japanese patent application laid-open No. 2004-64590.

With the foregoing configuration, the conventional digital broadcast receiving apparatus carries out the reception based on the combined diversity with the two receiving systems to obtain high receiving quality in the mobile reception.

On the other hand, the digital broadcasting can provide a user with conveniences by transmitting broadcast-related data in addition to the audio-video signal. More specifically, it provides program information to notify the user of future broadcasting contents. However, since the terrestrial wave digital broadcasting does not transmit information about the other broadcasting stations, although the user can obtain information about the receiving station, he or she cannot acquire information about the other stations not being received.

In view of this, a home-use digital broadcasting receiver activates its receiving circuit only when a user does not view without offering any audio-video information, and collects and stores receivable broadcasting information successively for future use as necessary.

As for the vehicle-mounted receiver, however, there is no guarantee that the power is supplied to the receiver while the user is not viewing or listening. Normally, when the user leaves a car, the power, which is usually supplied from an accessory power supply of the car, is turned off. Thus, it is rather rare that the power is supplied to the receiving apparatus while the user is not viewing or listening. Accordingly, there is a problem of being unable to correct the receivable broadcasting information while the user is not viewing or listening.

The present invention is implemented to solve the foregoing problems. Therefore it is an object of the present invention to provide a digital broadcast receiving apparatus having functions of not only maintaining stable receiving performance during moving by the diversity receiving function with two receiving systems by making effective use of the two receiving systems, but also receiving the broadcasting signal from a station to be viewed with a first receiving system, and receiving broadcasting waves of other stations with a second receiving system to acquire program-related information about the other stations.

DISCLOSURE OF THE INVENTION

The digital broadcast receiving apparatus in accordance with the present invention including: first and second receiving demodulation means each for receiving one of a broadcasting wave of a desired station and a broadcasting wave of another station in accordance with a setup, and for outputting a demodulation signal; a combining section for combining the respective demodulation signals when the first and second receiving demodulation means both receive the broadcasting waves of the same desired station; a first signal selecting section for selecting the demodulation signal of the broadcasting wave of the desired station from one of the first receiving demodulation means, the second receiving demodulation means and the combining section; first data extracting means for carrying out error correction of the signal fed from the first signal selecting section, for extracting video and audio data of the desired station from the signal passing through the error correction and supplying the video and audio data to a decoder, and for extracting and outputting program-related information data of the desired station; a second signal selecting section for selecting a demodulation signal of the broadcasting wave of the another station from the first receiving demodulation means or second receiving demodulation means; second data extracting means for carrying out error correction of the signal fed from the second signal selecting section, and for extracting and outputting program-related information data of the another station from the signal passing through the error correction; and a controller for establishing one of a first receiving mode and a second receiving mode, wherein the first receiving mode sets both the receiving frequencies of the first receiving demodulation means and the second receiving demodulation means at the same broadcasting wave frequency of the desired station, and sets the first signal selecting section in a manner as to select the demodulation signal from the combining section, and wherein the second receiving mode sets one of the receiving frequencies to the broadcasting wave frequency of the desired station and the other of them to the broadcasting wave frequency of the another station separately, sets the first signal selecting section in a manner as to select one of the demodulation signal of the first receiving demodulation means and the demodulation signal of the second receiving demodulation means, which demodulates the broadcasting wave of the desired station, and sets the second signal selecting section in a manner as to select one of the demodulation signal of the second receiving demodulation means and the demodulation signal of the first receiving demodulation means, which demodulates the broadcasting wave of the another station.

According to the present invention, the digital broadcast receiving apparatus has two systems of a first receiving demodulation means and a second receiving demodulation means; and makes it possible under the control of the controller to establish one of the two receiving modes: the first receiving mode in which the two receiving systems both receive the broadcasting waves of the same desired station; and the second receiving mode in which one of the two receiving stations receives the broadcasting wave of the desired station, and the other of them receives the broadcasting wave of another station. Thus, the first receiving mode enables the diversity receiving, and the diversity receiving function can maintain the receiving performance at a stable state during the movement of the vehicle. On the other hand, the second receiving mode enables one of the receiving systems to receive the broadcasting signal of the desired station, and the other receiving system to acquire the program-related information of another station. This enables effective use of the two receiving systems.

BRIEF DESCRIPTION OF THE DRAWINGS

FIGS. 2(a)-2(d) are diagrams illustrating effectiveness of a receiving mode based on combined diversity;

BEST MODE FOR CARRYING OUT THE INVENTION

The best mode for carrying out the invention will now be described with reference to the accompanying drawings to explain the present invention in more detail.

Embodiment 1

Figure 1:
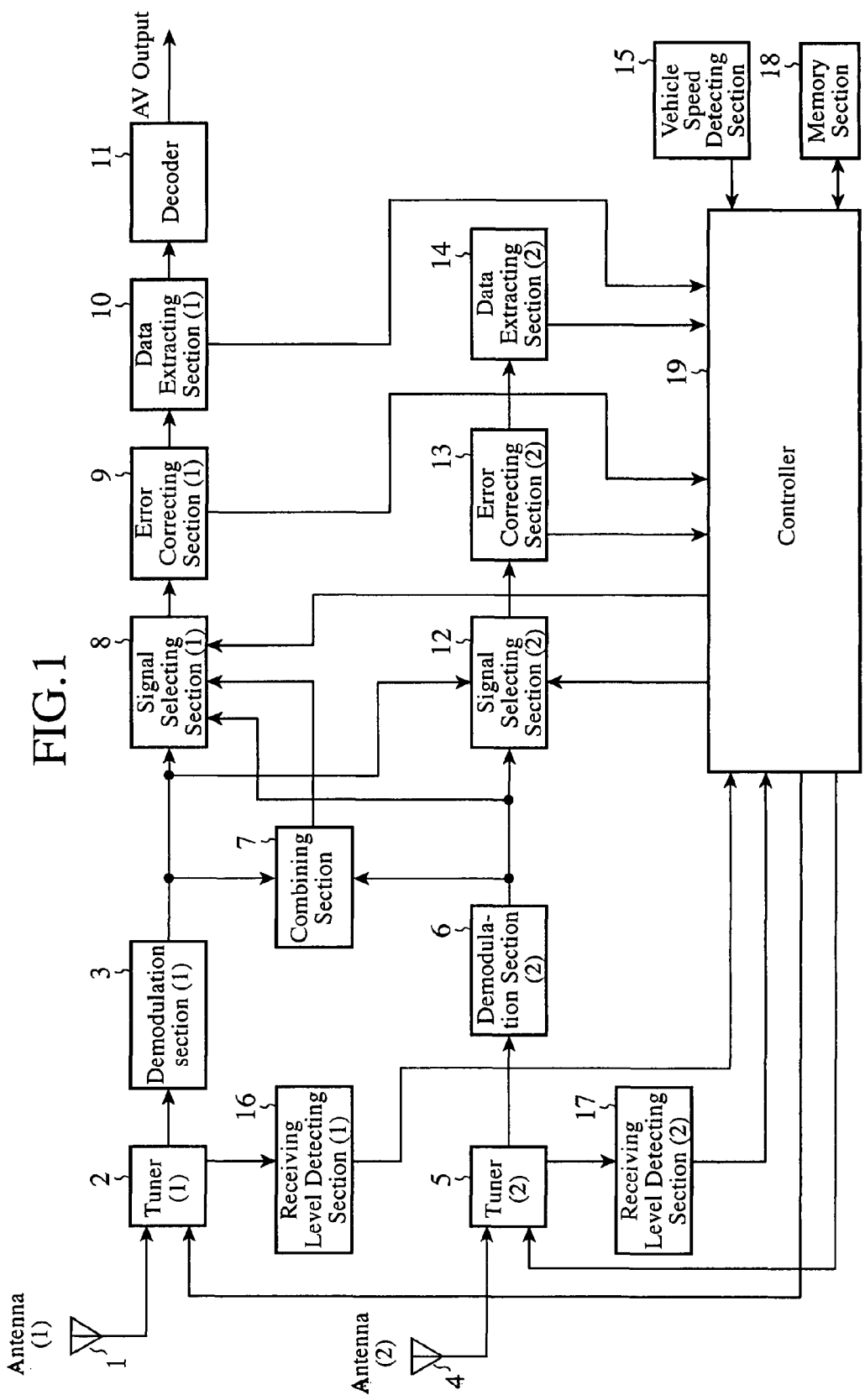
FIG. 1 is a block diagram showing a configuration of the digital broadcast receiving apparatus of an embodiment 1 in accordance with the present invention.

FIG. 1 is a block diagram showing a configuration of the digital broadcast receiving apparatus of an embodiment 1 in accordance with the present invention, which is an apparatus for receiving terrestrial digital broadcasts transmitting television signals in the form of digital signals.

In FIG. 1, the digital broadcast receiving apparatus includes a first receiving antenna 1, first tuner 2 and first demodulation section 3, which constitute a first receiving demodulation means; a second receiving antenna 4, second tuner 5 and second demodulation section 6, which constitute a second receiving demodulation means; a combining section 7; a first signal selecting section 8; a first error correcting section 9 and first data extracting section 10, which constitute a first data extracting means; a decoder 11; a second signal selecting section 12; a second error correcting section 13 and second data extracting section 14, which constitute a second data extracting means; a vehicle speed detecting section 15; a first receiving level detecting section 16; a second receiving level detecting section 17; a memory section 18 and a controller 19.

In the foregoing configuration, the first receiving antenna 1 receives radio waves of the terrestrial digital broadcasts.

To achieve large volume data transmission such as Hi-Vision video transmission within a limited broadcasting frequency bandwidth, the terrestrial digital broadcasting employs orthogonal frequency division multiplexing (called "OFDM" from now on) such as 64-valued quadrature amplitude modulation that uses many carrier waves passing through the multivalued digital modulation.

The first tuner 2 selects and receives the broadcasting wave of a desired station from the OFDM broadcasting waves received by the first receiving antenna 1, converts the frequency of the received broadcasting wave to a specific frequency with a superheterodyne system or quadrature demodulation system, and outputs an OFDM signal passing through the processing such as amplification.

The first demodulation section 3 demodulates the OFDM signal output from the first tuner 2: It converts the OFDM signal into a digital signal, applies a fast Fourier transform thereto, and restores amplitude/phase information of individual multiplexed carrier waves. The broadcasting transmission signal includes the so-called pilot carrier having predetermined amplitude/phase at predetermined frequency intervals. Referring to the demodulation signal of the pilot carrier, the first demodulation section 3 performs amplitude/phase correction of neighboring carrier waves, and outputs the results.

The second receiving antenna 4, second tuner 5 and second demodulation section 6, which are the same as the first receiving antenna 1, first tuner 2 and first demodulation section 3 in functions, constitute the two receiving systems with the first receiving antenna 1, first tuner 2 and first demodulation section 3.

The combining section 7 is provided for achieving the combined diversity receiving function employing the two receiving systems. It properly combines the two signals fed from the first demodulation section 3 and second demodulation section 6 in such a manner that even if the receiving signal of one of the two receiving systems is defective because of fading and the like, it compensates for the signal with the signal of the other system.

The first signal selecting section 8 selects one of the output signals from the first demodulation section 3, second demodulation section 6 and combining section 7 in accordance with the control of the controller 19 which will be described later.

The first error correcting section 9, which employs a method of adding redundancy to the transmission information, for example, is an FEC (Forward Error Correction) error correcting section that carries out self-correction without using a feedback path. It applies the error correction to the signal fed from the first signal selecting section 8 by changing data sequence by a predetermined procedure, that is, by carrying out deinterleaving. The signal passing through the error correction in this way is fed to the first data extracting section 10, and the transmission error information resulting from the error correction is delivered to the controller 19 which will be described later.

The first data extracting section 10 divides the video signal, audio signal and supplementary information into a packet format of a comparatively short time period each, and reconstructs a series of signals with the same contents by separating and extracting respective information items from the time-division multiplexed broadcasting signal. In the configuration of FIG. 1, the video and audio signal data are fed to the decoder 11, and the program-related information is fed to the controller 19 which will be described later.

The decoder 11 restores a time-series sampled signal (PCM signal) by releasing the data compression of the video signal and audio signal which are reconstructed and output by the first data extracting section 10. The output of the decoder 11 undergoes DA (digital-to-analog) conversion, and is output as the analog video signal and audio signal to be provided to a viewer.

The second signal selecting section 12, second error correcting section 13 and second data extracting section 14 each have the same functions as the first signal selecting section 8, first error correcting section 9 and first data extracting section 10.

The vehicle speed detecting section 15 detects the traveling speed of the vehicle.

The first receiving level detecting section 16 detects the receiving level of the broadcasting wave selected and received by the first tuner 2 constituting the first receiving demodulation means.

The second receiving level detecting section 17 detects the receiving level of the broadcasting wave selected and received by the second tuner 5 constituting the second receiving demodulation means.

The memory section 18 records, through the controller 19 which will be described later, the program-related information about each broadcasting station acquired.

The controller 19, which is the center of the configuration of FIG. 1, carries out various types of control. For example, it sets the receiving frequency of the first tuner 2 and that of the second tuner 5, the selection of the first signal selecting section 8 and that of the second signal selecting section 12, and stores and updates the program-related information in the memory section 18. The controller 19, which is composed of a microcomputer, for example, has a reading function of various data, a comparing and decision function, a setting function, a memory section control function and a clock function.

To achieve the foregoing control, the controller 19 is supplied with the signals from the first error correcting section 9, second error correcting section 13, first data extracting section 10, second data extracting section 14, vehicle speed detecting section 15, first receiving level detecting section 16 and second receiving level detecting section 17.

Next, the basic function of the digital broadcast receiving apparatus of the foregoing configuration (FIG. 1) will be described.

The digital broadcast receiving apparatus of FIG. 1 has a function of switching between two types of receiving modes.

A first one of them is a receiving mode (referred to as a "first receiving mode" from now on) that sets the receiving frequencies of the first tuner 2 and second tuner 5 to the receiving frequency of the broadcasting wave to be viewed; that sets the first signal selecting section 8 in such a manner as to select the output of the combining section 7; followed by delivering the output of the first signal selecting section 8 to the first error correcting section 9, followed by causing the first error correcting section 9, first data extracting section 10 and decoder 11 to carry out the prescribed processing described before, and followed by causing the decoder 11 to output the video and audio (AV) signals.

The first receiving mode, which is a configuration for performing the diversity reception of the broadcasting wave of the station to be viewed, is a combined diversity receiving mode in which the combining section 7 combines the receiving signals of the two receiving systems having their receiving frequencies set at the same frequency as described above.

A second one of them is a receiving mode (referred to as a "second receiving mode" from now on) that sets one of the first tuner 2 and second tuner 5 to the receiving frequency of the broadcasting wave of the station to be viewed as a desired station, and sets the other of the tuners to the receiving frequency of the broadcasting wave of a station other than the station to be viewed as the station other than the desired station; and that sets the first signal selecting section 8 and second signal selecting section 12 in such a manner that the first signal selecting section 8 selects one of the output of the first demodulation section 3 for demodulating the broadcasting wave to be viewed and the output of the second demodulation section 6, and the second signal selecting section 12 selects one of the output of the second demodulation section 6 for demodulating the broadcasting wave of the other station and the output of the first demodulation section 3; followed by carrying out, as to the output of the first signal selecting section 8, the same processing as the first receiving mode; followed by delivering the output of the second signal selecting section 12 to the second error correcting section 13; followed by performing the prescribed processing by the second error correcting section 13 and second data extracting section 14; and followed by supplying the controller 19 with the program-related information of the other station extracted by the second data extracting section 14.

The second receiving mode is a receiving mode that has the first receiving system of the two receiving systems receive the broadcasting wave of the station to be viewed, and the second receiving system receive the broadcasting wave of the other station to acquire the program-related information of the other station.

Here, the effectiveness of the receiving mode according to the combined diversity of the first receiving mode will be described with reference to FIG. 2.

FIGS. 2(*a*)-2(*d*) are diagrams illustrating the effectiveness of the receiving mode according to the combined diversity.

A broadcasting wave based on the OFDM, which is a receiving target of the digital broadcast receiving apparatus, includes many carrier waves as described above. FIGS. 2(*a*)-2(*d*) illustrate the many carrier waves with the horizontal axes representing their frequencies and the vertical axes representing their receiving levels. Among these diagrams, FIG. 2(*a*) illustrates an ideal receiving state as the combined diversity receiving. In contrast, as for FIG. 2(*b*) and FIG. 2(*c*), one of them illustrates the receiving state by the first receiving antenna 1, first tuner 2 and first demodulation section 3, and the other of them illustrates the receiving state by the second receiving antenna 4, second tuner 5 and second demodulation section 6. Both the receiving states show the degradation of the receiving quality because of the effect of fading or multipath. In particular, FIG. 2(*b*) shows larger degradation. FIG. 2(*d*) illustrates the state resulting from combining the receiving signals in the states illustrated in FIG. 2(b) and FIG. 2(c) by the combining section 7. As illustrated in FIG. 2(d), even if the receiving signal of one of the two receiving systems is defective because of fading and the like, the signal of the other system can compensate for the defects, thereby being able to obtain good receiving quality close to FIG. 2(a).

The receiving function according to the combined diversity is particularly effective when the digital broadcast receiving apparatus mounted on a mobile unit such as a vehicle carries out the mobile reception of the broadcasting wave. This is because it can achieve good receiving quality with circumventing the effect of the fading or multipath.

The first receiving mode (diversity receiving) is not always necessary when the receiving condition of the broadcasting wave is good. For example, it is not necessary when the vehicle travels at a slow speed, or when the receiving level of the broadcasting wave is high enough. In such cases, the second receiving mode becomes effective: While the first receiving system receives the broadcasting wave of a desired station to enable viewing, the second receiving system enables acquiring the program-related information about other stations. The program-related information acquired is stored in the memory section 18 by the controller 19 for later use as necessary.

Incidentally, a fixed digital broadcast receiving apparatus installed in a house or the like sequentially collects the program-related information of all the receivable broadcasting stations even when the audio-video viewing is inactive for later use as necessary. This is because it is easy and normal to maintain the fixed digital broadcast receiving apparatus at a preheated state in which the receiving circuit is kept in the active state.

However, as for the digital broadcast receiving apparatus mounted on a mobile unit such as a vehicle, there is no guarantee that the receiving apparatus is supplied with power during the inactive state of the audio-video viewing. Normally, the power supply fed as the accessory power supply of a car is turned off when the user (driver) leaves the vehicle. Thus, the state is considered to be rare in which the power is supplied to the receiving apparatus in the viewing inactive state. Accordingly, the digital broadcast receiving apparatus having only the function of the first receiving mode (diversity receiving) cannot acquire the program-related information of other stations because it cannot select other stations during viewing. Thus, the second receiving mode becomes an effective function.

The setup of the first receiving mode or the second receiving mode is carried out by the controller 19, which will be described below.

Next, the receiving mode setup by the controller 19 will be described with reference to the flowchart of FIG. 3.

At step ST1, the controller 19 starts the receiving processing in response to a receiving request. At step ST2, the controller 19 acquires the vehicle speed data from the vehicle speed detecting section 15, and makes a decision as to whether the vehicle speed data is equal to or greater than a predetermined threshold value. If the decision indicates that the vehicle speed data is less than the predetermined threshold value (No at step ST2), the processing proceeds to step ST3. In contrast, if it is equal to or greater than the predetermined threshold value (Yes at step), the processing proceeds to step ST10, which will be described later.

The reason for employing the vehicle speed data obtained by the vehicle speed detecting section 15 for making the decision as to the setup of the receiving mode is as follows. For example, if the receiving is carried out by only one of the first tuner 2 and second tuner 5 (second receiving mode) during high speed traveling of the vehicle, the deterioration of the receiving quality will be large. Thus, during the high speed traveling of the vehicle, the diversity receiving based on the first receiving mode is established rather than setting up the second receiving mode, thereby circumventing the deterioration in the receiving quality. In contrast with this, during stopping or low speed traveling of the vehicle less than a specified speed, it is not necessary to be restricted to the first receiving mode.

At step ST3, the controller 19 makes a decision as to whether an other station check request is present or not. If the other station check request is present (Yes at step ST3), the processing proceeds to step ST4. If the other station check request is absent (No at step ST3), the processing proceeds to step ST10, which will be described later.

The other station check request is generated by the controller 19 itself in accordance with the remaining recording in the memory section 18 controlled by the controller 19 (described later). In this case, the controller 19 issues the request at intervals sufficient to collect the program-related information with minimizing the effect on the reception of the broadcast to be viewed. For example, the controller 19 issues the other station check request once a day.

At step ST4, the controller 19 sets both the first tuner 2 and second tuner 5 at the same broadcasting wave frequency of the station to be viewed. Then, the controller 19 acquires the two receiving level data detected by the first receiving level detecting section 16 and second receiving level detecting section 17, and reads the two receiving levels.

The reason for employing both the receiving levels detected by the first receiving level detecting section 16 and second receiving level detecting section 17 for making the decision is to avoid the following inconvenience. That is, in the case where the receiving level is low, even when the vehicle is stopping or traveling at a vehicle speed less than the predetermined threshold value (step ST2), the receiving can become impossible if performed carelessly by only one of the first antenna 1 and second antenna 4. For example, when one of the two antennas, which is lower in the receiving level, is selected from the first antenna 1 and second antenna 4, the inconvenience of disabling the reception can occur. This is the case where the diversity reception will be able to save the deterioration in the receiving quality. To circumvent such inconvenience, the two antennas 1 and 4 detect the receiving levels, and the controller 19 sets up the receiving mode in accordance with the detection results. This makes it possible to establish effective receiving mode.

In this case, the controller 19 sets the receiving system with a greater receiving level at the broadcast reception to be viewed, and the receiving system with a lower receiving level at the other station reception.

At step ST5, the controller 19 compares the receiving level (1) of the first receiving level detecting section 16 with the receiving level (2) of the second receiving level detecting section 17, which are read at step ST4, and makes a decision as to whether the receiving level (1) is greater than the receiving level (2).

When the receiving level (1) is greater than the receiving level (2) as a result of the decision (Yes at step ST5), the processing proceeds to step ST6. In contrast, when the receiving level (1) is not greater than the receiving level (2) (No at step ST5), the processing proceeds to step ST7.

At step ST6, the controller 19 makes a decision as to whether the receiving level (1) of the first receiving level detecting section 16 is equal to or greater than the predetermined threshold value. When the receiving level (1) is equal to or greater than the predetermined threshold value according to the decision (Yes at step ST6), the processing proceeds to step ST8. In contrast, when it is less than the predetermined threshold value (No at step ST6), the processing proceeds to step ST10, which will be described later.

At step ST7, the controller 19 makes a decision as to whether the receiving level (2) of the second receiving level detecting section 17 is equal to or greater than the predetermined threshold value. When the receiving level (2) is equal to or greater than the predetermined threshold value according to the decision (Yes at step ST7), the processing proceeds to step ST9. In contrast, when it is less than the predetermined threshold value (No at step ST7), the processing proceeds to step ST10, which will be described later.

At step ST8, the controller 19 sets the receiving mode at the second receiving mode. More specifically, it sets the receiving frequency of the broadcasting wave of the desired station to be viewed, which is requested to receive (step ST1), to the first tuner 2. In addition, it has the receiving system on the first tuner 2 side (referred to as the "first system" from now on) receive the broadcasting wave of the station to be viewed. Furthermore, the controller 19 sets the first signal selecting section 8 in such a manner as to select the demodulation output from the first demodulation section 3 of the first system side. Thus, the signal for viewing passing through the reception and demodulation is delivered to the decoder 11 via the first error correcting section 9 and first data extracting section 10. The decoder 11 outputs audio and video (AV) signals.

The program-related information signal contained in the broadcasting wave of the desired station to be viewed is supplied from the first data extracting section 10 to the controller 19 to be recorded in the memory section 18.

The reason for setting the broadcast reception of the station to be viewed at the first system side is that the receiving level (1) of the first system side is greater than the receiving level (2), thereby being able to offer quality television broadcast viewing.

On the other hand, the receiving system on the second tuner 5 side (referred to as "second system" from now on) carries out the other station check in accordance with the decision result at step ST3. To achieve this, the controller 19 sets to the second tuner 5 the receiving frequencies of the broadcasting waves of the receivable other stations sequentially, and receives them. In addition, the controller 19 sets the second signal selecting section 12 in such a manner as to select the demodulation output of the second demodulation section 6 of the second system side. Thus, the program-related information signal passing through the reception and demodulation is supplied to the controller 19 via the second error correcting section 13 and second data extracting section 14, and is recorded in the memory section 18. As for the recording to the memory section 18, it will be described later.

At step ST9, the controller 19 sets the receiving mode at the second receiving mode in the same manner as at step ST8. In this case, however, since the receiving level (2) of the second system side is greater than the receiving level (1), the setup of the receiving mode is carried out in the way opposite to that of step ST8. More specifically, the second system receives the broadcasting wave of the station to be viewed, and the first system carries out the other station check. Thus, the controller 19 sets to the second tuner 5 the receiving frequency of the broadcasting wave of the station to be viewed, and sets to the first tuner 2 the receiving frequencies of the broadcasting waves of the receivable other stations sequentially, and receives them.

As for the setting up of the signal selecting sections 8 and 12, it is carried out in the way opposite to that of step ST8. More specifically, the controller 19 sets the first signal selecting section 8 in such a manner that it selects the demodulation output of the second demodulation section 6, and sets the second signal selecting section 12 in such a manner that it selects the demodulation output of the first demodulation section 3. The reason for setting the signal selecting sections 8 and 12 in this way is that the decoder 11 for outputting the audio and video (AV) signals is provided on the first signal selecting section 8 side.

The subsequent processing of the first signal selecting section 8 and second signal selecting section 12 is the same as that of step ST8.

At step ST10, the controller 19 sets the receiving mode to the first receiving mode to establish the diversity receiving mode. Thus, both the first and second systems receive the broadcasting wave of the station to be viewed. To achieve this, the controller 19 sets the same receiving frequency to both the first tuner 2 and second tuner 5 for the broadcasting wave of the station to be viewed. In addition, it sets the first signal selecting section 8 in such a manner as to select the output of the combining section 7.

In this way, the diversity receiving mode employing the two receiving systems is established when all the following conditions are satisfied: the vehicle speed data is equal to or greater than the predetermined threshold value (Yes at step ST2); the other station check request is absent (No at step ST3); the receiving level (1) detected by the first receiving level detecting section 16 is less than the predetermined threshold value (No at step ST6); and the receiving level (2) detected by the second receiving level detecting section 17 is less than the predetermined threshold value (No at step ST7).

At step ST11, the controller 19 makes a decision as to whether the reception end request is present, and when the reception end request is absent (No at step ST11), it returns the processing to step ST2 to repeat the processing from step ST2 forward. In contrast, when the reception end request is present (Yes at step ST11), the processing proceeds to step ST12.

At step ST12, the controller 19 quits the receiving processing, thereby terminating the processing of the receiving mode.

Next, the recording of the program-related information into the memory section 18 under the control of the controller 19 will be described with reference to FIG. 4.

Figure 4:
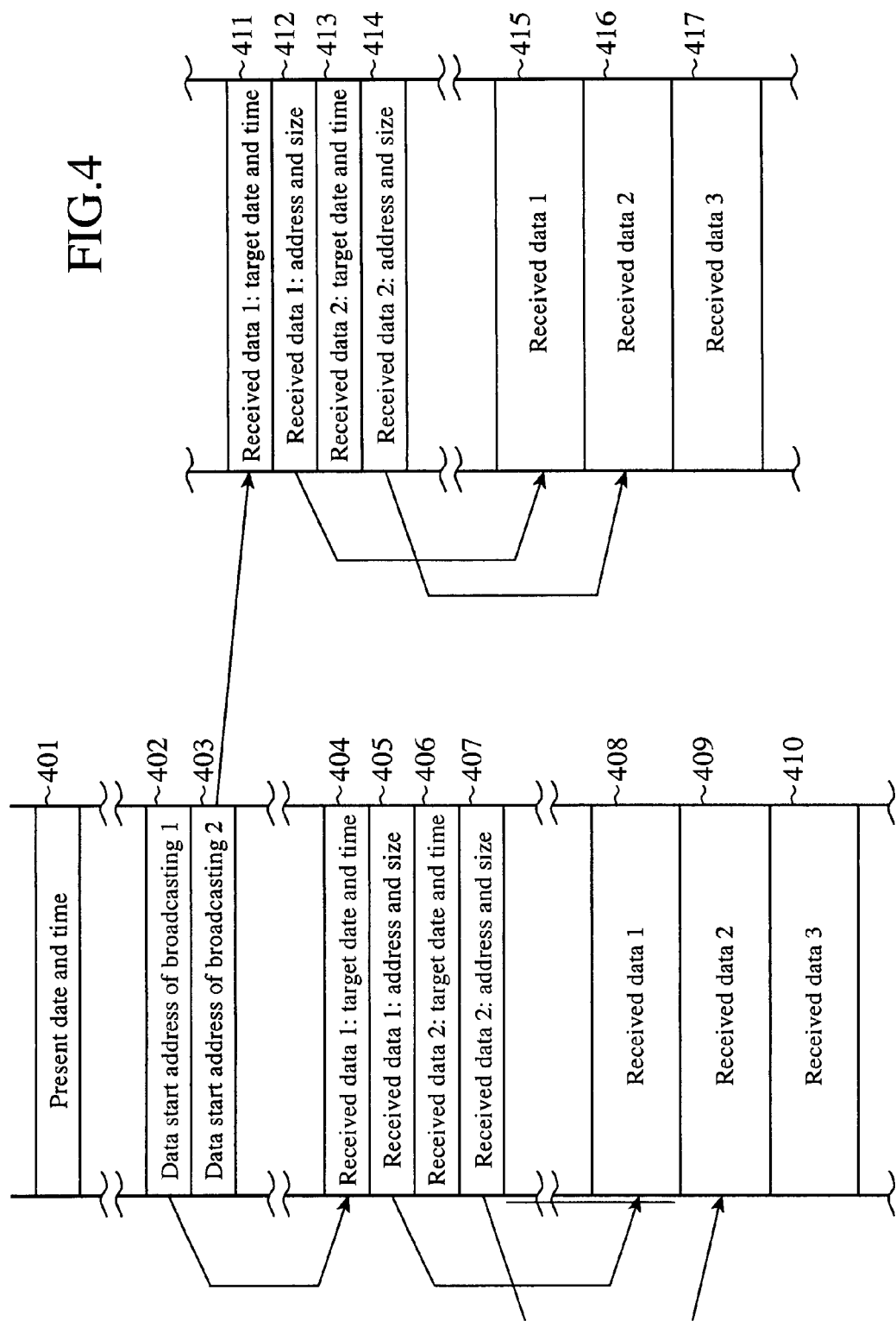
FIG. 4 is a diagram illustrating an example of record contents of program-related information stored into the memory section of the digital broadcast receiving apparatus of the embodiment 1 in accordance with the present invention.

FIG. 4 is a diagram illustrating an example of the record contents of the program-related information to be stored into the memory section 18.

In FIG. 4, the recording location 401 of the memory section 18 records information about the present date and time under the control of the controller 19. The information about the present date and time can be extracted from the received broadcasting signal by the first data extracting section 10 or second data extracting section 14, or acquired from an internal clock function of the controller 19.

The recording location 402 records the front position information (broadcasting 1 data start address) from which the program-related information about the first broadcasting station is placed in the memory section 18. Likewise, the recording location 403 records the front position information (broadcasting 2 data start address) from which the program-related information about the second broadcasting station is placed in the memory section 18. When there are further receivable broadcasting stations, the recording locations subsequent to the recording location 403 record the front position information from which the program-related information about the broadcasting stations is placed. This enables recording and reading of the program-related information contents.

Assume that the data (received data) on the received program-related information about the first broadcasting station fall into three types, received data 1-received data 3. In this case, as shown in FIG. 4, the received data 1-received data 3 are recorded at the recording locations 408, 409 and 410. In addition, as the index information about the recorded received data, the target date and time of the received data and the front position information and data amount are recorded from the recording location 404 forward. More specifically, as the index information about the received data 1, the recording location 404 records the target date and time of the received data 1, and the recording location 405 records the front position information and data amount (address and size) of the received data 1. The data at the recording locations 402 and 403 indicate the recording locations of the index information items.

Likewise, the recording locations 406 and 407 record the target date and time of the received data 2 and the front position information and data amount (address and size) thereof as the index information about the received data 2. From that location onward, the index information about the received data 3 is recorded at the recording location following the recording location 407 (not shown).

The recording locations 404-410 are a recording area corresponding to the first broadcasting station recorded at the recording location 402. On the other hand, the recording locations 411-417 are the recording area corresponding to the second broadcasting station recorded at the recording location 403. More specifically, assume that the data (received data) on the received program-related information about the second broadcasting station also fall into three types, received data 1-received data 3. In this case, the received data 1-received data 3 are recorded at the recording locations 415, 416 and 417, respectively. In addition, as the index information about the received data 1, the recording location 411 records the target date and time of the received data 1, and the recording location 412 records the front position information and data amount (address and size) of the received data 1. Likewise, as the index information about the received data 2, the recording location 413 records the target date and time of the received data 2, and the recording location 414 records the front position information and data amount (address and size) of the received data 2.

Here, the program-related information and the information about the time when the program is broadcast are transmitted as a pair. To record and read the information contents in accordance with the broadcasting time, as for the data of the first broadcasting station at a particular time such as the received data 1 at the recording location 408, the controller 19 can manage the data according to the index information provided in the form of the target date and time at the recording location 404 and the front position information and data amount (address and size) at the recording location 405 as shown in FIG. 4. Likewise, as for the received data 2 at the recording location 409 corresponding to the next broadcast, the controller 19 can manage the data according to the index information provided in the form of the target date and time at the recording location 406 and the front position information and data amount (address and size) at the recording location 407. This also applies to the program-related information of the second broadcasting station.

Since the record data about the program-related information described above grow old as the current time progresses, the data previous to the current time must be deleted sequentially by the controller 19. The deletion processing is carried out at regular intervals as follows: Sequentially comparing the current date and time information (recording location 401) with the target date and time information (recording location 404 or 411) at the front position of the program-related information data of each broadcasting station; when the data previous to the current time are present, deleting the index information together with the received data as the main data, and placing the recording locations close together.

Furthermore, the controller 19 can check the amount of information stored as the future broadcasting information in terms of hours by tracing the target date and time information in the index information such as from the recording location 404 to the recording location 406, and then to the next recording location. Thus, the controller 19 can issue the "other station check request (step ST3)" as described in connection with FIG. 3 in accordance with the remaining amount of the program-related information about the broadcasting station. Thus, it can hold to the minimum the switching frequency to the second receiving mode that can bring about the deterioration in the receiving performance.

As described above, the present embodiment 1 is configured in such a manner that as a receiving system it has two systems including a first receiving demodulation means composed of the first receiving antenna 1, first tuner 2 and first demodulation section 3, and the second receiving demodulation means composed of the second receiving antenna 4, second tuner 5 and second demodulation section 6; and makes it possible under the control of the controller 19 to set up one of the two receiving modes: the first receiving mode in which the two receiving systems receive the broadcasting wave of the same station to be viewed; and the second receiving mode in which one of the two receiving stations receives the broadcasting wave of the station to be viewed, and the other of the two receiving systems receives the broadcasting waves of other stations. Thus, the first receiving mode enables the diversity receiving. The diversity receiving function can maintain the receiving performance at a stable state during the traveling of the vehicle. On the other hand, the second receiving mode enables the first receiving system to receive the broadcasting signal of the station to be viewed, and the second receiving system to acquire the program-related information of other stations. This enables effective use of the two receiving systems.

In addition, the controller 19 is configured in such a manner as to set up the first receiving mode when the vehicle traveling speed detected by the vehicle speed detecting section 15 is equal to or greater than the predetermined threshold value. Accordingly, when the vehicle traveling speed is equal to or greater than the predetermined threshold value, the diversity receiving is established. The diversity receiving function makes it possible to circumvent the deterioration in the receiving quality during the traveling of the vehicle, and to maintain the receiving performance at a stable state during the movement of the vehicle.

Furthermore, the controller 19 is configured in such a manner as to set up the first receiving mode when one of the receiving levels detected by the first receiving level detecting section 16 and second receiving level detecting section 17 is less than the predetermined threshold value; and to set up, when both the receiving levels detected are equal to or greater than the predetermined threshold value, the second receiving mode in which the tuner (2 or 5) with a greater receiving level sets its receiving frequency at the broadcasting wave frequency of the station to be viewed, and the tuner (5 or 2) with a lower receiving level sets its receiving frequency at the broadcasting wave frequency of another station. Accordingly, when the receiving level is less than the predetermined threshold value, the diversity receiving is established, which can offer the advantage of the diversity receiving.

In addition, when the receiving level is equal to or greater than the predetermined threshold value, the configuration is established in which the tuner (2 or 5) with the higher receiving level receives the station to be viewed, and the tuner (5 or 2) with the lower receiving level acquires the program-related information of other stations. This makes it possible to acquire program-related information about other stations while viewing quality television broadcast.

Furthermore, the controller 19 is configured in such a manner as to set the second receiving mode in accordance with the remaining recording amount in the memory section 18 after deleting the program-related information data recorded before, and to acquire the program-related information by the first data extracting section 10 and second data extracting section 14 to update and record the data into the memory section. This makes it possible to suffice the memory section 18 with the program-related information with restricting to the minimum the switching frequency to the second receiving mode which can bring about the degradation of the receiving performance.

Embodiment 2

Figure 5:
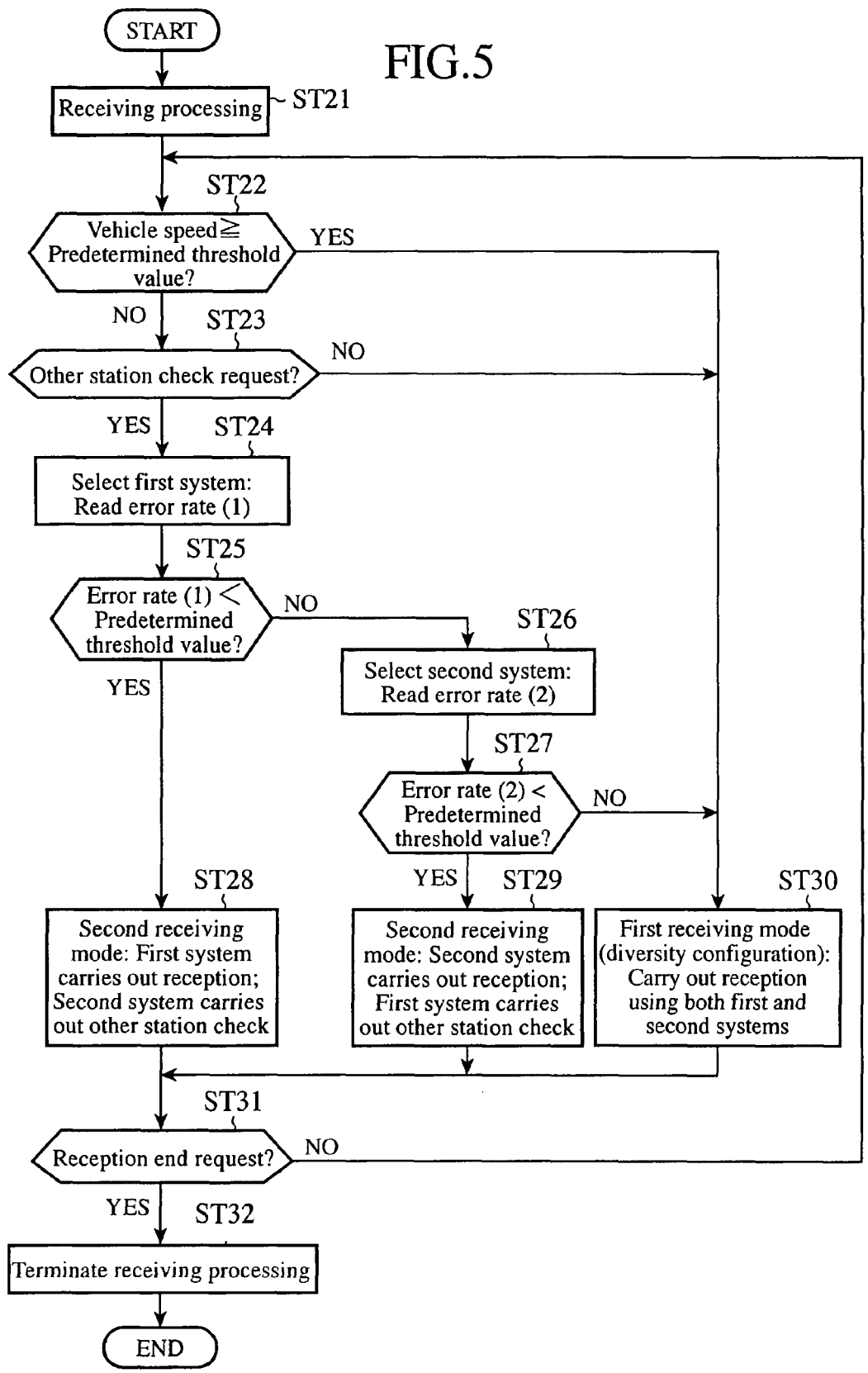
FIG. 5 is a flowchart illustrating processing of a receiving mode setup by the controller of the digital broadcast receiving apparatus of the embodiment 2 in accordance with the present invention.

FIG. 5 is a flowchart illustrating receiving mode setup processing by the controller of the digital broadcast receiving apparatus of an embodiment 2 in accordance with the present invention.

The receiving mode setup processing explained in the embodiment 1 (FIG. 3) employs the receiving levels detected by the first receiving level detecting section 16 and second receiving level detecting section 17 of FIG. 1 as one of the decision factors of the receiving mode setup. The receiving mode setup processing of the embodiment 2 employs, instead of the receiving levels detected by the first receiving level detecting section 16 and second receiving level detecting section 17, the error rate of the data obtained from the error correction by the first error correcting section 9 and second error correcting section 13 of FIG. 1 as one of the decision factors of the receiving mode setup.

The receiving mode setup processing by the controller 19 in the present embodiment 2 will be described with reference to FIG. 1 and FIG. 5.

Figure 3:
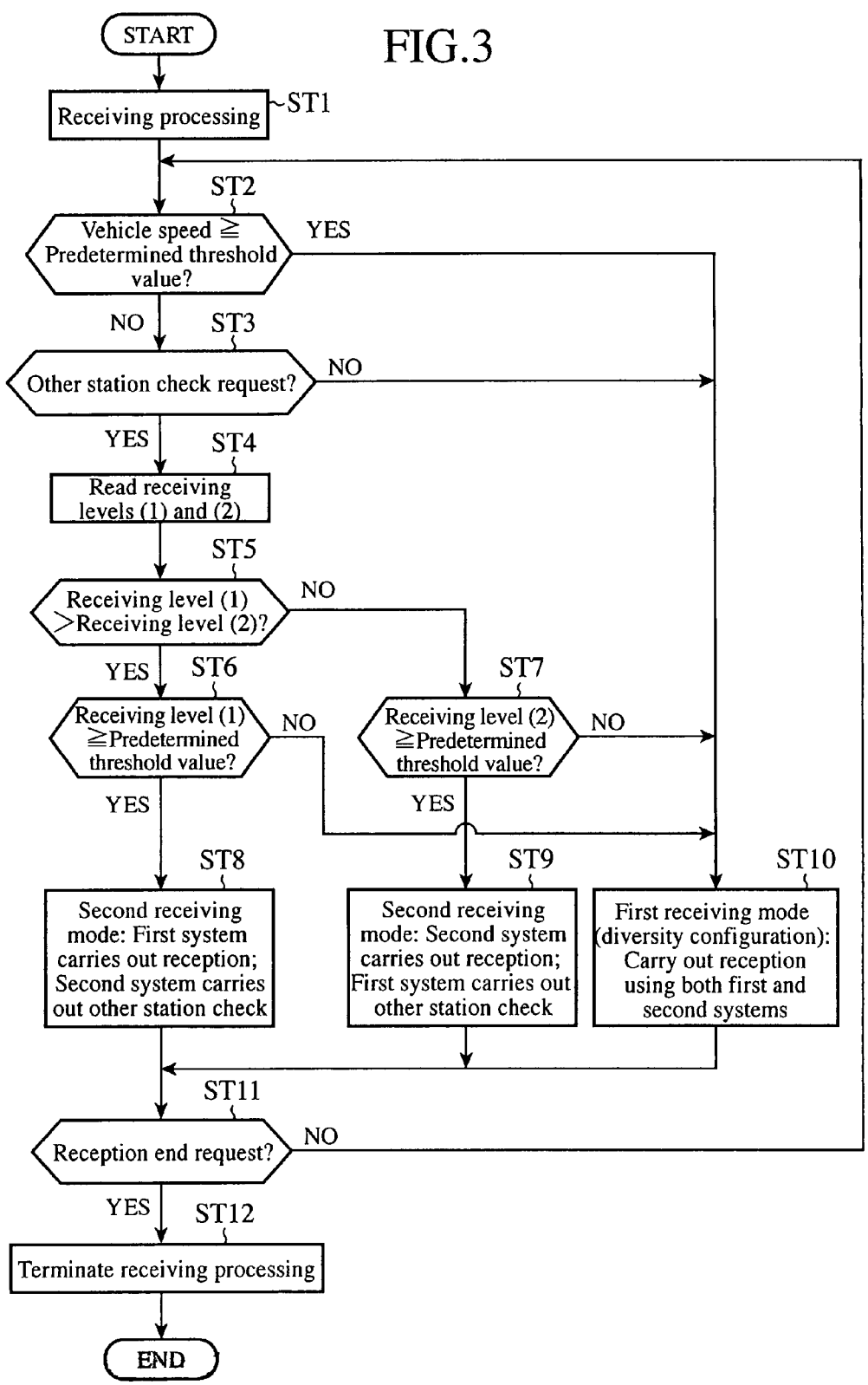
FIG. 3 is a flowchart illustrating processing of a receiving mode setup by the controller of the digital broadcast receiving apparatus of the embodiment 1 in accordance with the present invention.

In FIG. 5, since the processing contents at step ST21, step ST22 and step ST23 are the same as those of step ST1, step ST2 and step ST3 of FIG. 3, their description will be omitted here.

At step ST24, when the other station check request is present (Yes at step ST23), the controller 19 sets both the first tuner 2 and second tuner 5 at the same broadcasting wave frequency of the station to be viewed. Then, the second signal selecting section 12 selects the first receiving system, and acquires the demodulation signal from the first demodulation section 3 of the first system. The controller 19 reads the error rate (1) of the data signal from the information about the error correction by the second error correcting section 13 for the demodulation signal from the second signal selecting section 12.

Here, the reason for employing the error rate of the data signal as a decision factor is as follows. A state with a small error rate means that the receiving quality is good because the transmission state of the broadcasting wave is good, in which case it is not always necessary to set up the diversity receiving (first receiving mode). In contrast, a state with a large error rate means that the receiving quality is bad because the transmission state of the broadcasting wave is bad, in which case it is necessary to circumvent unreceivable condition by establishing the diversity receiving.

At step ST25, the controller 19 makes a decision as to whether the error rate (1) of the data signal read at step ST24 is less than a predetermined threshold value.

When the error rate (1) exceeds the predetermined threshold value in the decision (No at step ST25), the processing proceeds to step ST26. In contrast, when the error rate (1) is less than the predetermined threshold value (Yes step ST25), the processing proceeds to step ST28.

At step ST26, the controller 19 has the second signal selecting section 12 select the second receiving system and acquire the demodulation signal from the second demodulation section 6 of the second system. Then, the controller 19 reads the error rate (2) of the data signal from the information about the error correction by the second error correcting section 13 for the demodulation signal from the second signal selecting section 12.

At step ST27, the controller 19 makes a decision as to whether the error rate (2) of the data signal read at step ST26 is less than a predetermined threshold value.

When the error rate (2) is less than the predetermined threshold value in the decision (Yes step ST27), the processing proceeds to step ST29. In contrast, when the error rate (2) exceeds the predetermined threshold value (No at step ST27), the processing proceeds to step ST30.

Since the processing contents of the subsequent step ST28, step ST29, step ST30, step ST31 and step ST32 are the same as those of step ST8, step ST9, step ST10, step ST11 and step ST12 of FIG. 3, their description will be omitted here.

In this way, the diversity receiving mode employing the two receiving systems is established when the vehicle speed data is equal to or greater than the predetermined threshold value (Yes at step ST22), when the other station check request is absent (No at step ST23), or when the error rates (1) and (2) of the data signal of both the first system and second system of the receiving system exceed the predetermined threshold value (No at steps ST25 and ST27).

In contrast, the second receiving mode, which enables viewing the broadcasting wave selected and checking other stations, is established when the vehicle speed data is less than the predetermined threshold value (No at step ST22), when the other station check request is present (Yes at step ST23), and when one of the error rate (1) of the data signal of the first system of the receiving system and the error rate (2) of the data signal of the second system is less than the predetermined threshold value (Yes at step ST25 or Yes at step ST27).

Although steps ST24 and ST25 handle the first system of the receiving system (first tuner 2 side), and steps ST26 and ST27 handle the second system of the receiving system (second tuner 5 side) in the foregoing description, they can be interchanged so that steps ST24 and ST25 handle the second system of the receiving system (second tuner 5 side), and steps ST26 and ST27 handle the first system of the receiving system (first tuner 2 side).

As described above, the present embodiment 2 is configured in such a manner that the controller 19 reads, after making a decision as to the vehicle speed data fed from the vehicle speed detecting section 15, the error rate information about the received data from the information about the error correction by the second error correcting section 13 as to the demodulation signals of the first demodulation section 3 and second demodulation section 6, which are acquired by the second signal selecting section 12; sets up the first receiving mode when both the read error rate information items exceed the predetermined threshold value; and sets up, when one of the read error rate information items is less than the predetermined threshold value, the second receiving mode which sets the receiving frequency of the tuner (2 or 5) with the error rate less than the predetermined threshold value to the broadcasting wave frequency of the station to be viewed, and the receiving frequency of the other tuner (5 or 2) to the broadcasting wave frequency of another station. Thus, the present embodiment 2 establishes the diversity receiving when the error rates exceed the predetermined threshold value, thereby being able to offer the advantage of the diversity receiving.

In addition, the setup, in which the tuner (2 or 5) with the error rate less than the predetermined threshold value receives the station to be viewed, and the other tuner (5 or 2) acquires the program-related information of other stations, makes is possible to acquire program-related information of other stations while viewing the quality television broadcast as in the foregoing embodiment 1.

INDUSTRIAL APPLICABILITY

As described above, because of the diversity receiving function based on the two receiving systems, the digital broadcast receiving apparatus in accordance with the present invention is suitable for acquiring the program-related information of other stations while receiving with one of the receiving systems.

What is claimed is:

1. A digital broadcast receiving apparatus mountable on a mobile unit, comprising:

first receiving demodulation unit for receiving through a first receiving antenna mounted on the mobile unit, one of a broadcasting wave of a desired station, and a broadcasting wave of another station among a plurality of receivable other stations different from the desired station in accordance with a setup, and for outputting a demodulation signal;

second receiving demodulation unit for receiving through a second receiving antenna mounted on the mobile unit, one of the broadcasting wave of the desired station, and the broadcasting wave of the another station different from the desired station in accordance with the setup, and for outputting a demodulation signal;

a combining section for combining the respective demodulation signals when said first receiving demodulation unit and said second receiving demodulation unit both receive the broadcasting waves of the same desired station;

a first signal selecting section for selecting the demodulation signal of the broadcasting wave of the desired station from one of said first receiving demodulation unit, said second receiving demodulation unit and said combining section;

first data extractor for carrying out error correction of the signal fed from said first signal selecting section, for extracting video and audio data of said desired station from the signal passing through the error correction and supplying the video and audio data to a decoder, and for extracting and outputting program-related information data contained in the broadcasting wave of the desired station;

a second signal selecting section for selecting a demodulation signal of the broadcasting wave of said another station from one of said first receiving demodulation unit and said second receiving demodulation unit;

second data extractor for carrying out error correction of the signal fed from said second signal selecting section, and for extracting and outputting program-related information data contained in the broadcasting wave of said another station from the signal passing through the error correction; and a controller for switching between a first receiving mode and a second receiving mode in response to a setup instruction signal, wherein said first receiving mode sets receiving frequencies of said first receiving demodulation unit and said second receiving demodulation unit to the same broadcasting wave frequency of said desired station, and sets said first signal selecting section in a manner as to select the demodulation signal from said combining section, and wherein said second receiving mode sets one of the receiving frequencies of said first receiving demodulation unit and second receiving demodulation unit to the broadcasting wave frequency of said desired station, sets other receiving frequencies to the broadcasting wave frequencies of said plurality of receivable other stations sequentially, sets said first signal selecting section in a manner as to select one of the demodulation signal of said first receiving demodulation unit and the demodulation signal of said second receiving demodulation unit, which demodulates the broadcasting wave of said desired station, and sets said second signal selecting section in a manner as to select one of the demodulation signal of said second receiving demodulation unit and the demodulation signal of said first receiving demodulation unit, which demodulates the broadcasting wave of said another station, and wherein the controller compares receiving levels of the first receiving system and the second receiving system only when both receiving systems are receiving the same broadcasting wave, and based on said comparison, the controller establishes the second receiving mode which enables the receiving system having a greater receiving level to receive the broadcasting wave of said desired station to be viewed, and sets the other receiving system to the receiving frequencies of the broadcasting waves of said receivable other stations in a manner so that the other receiving system can sequentially acquire program-related information of said receivable other stations.

2. The digital broadcast receiving apparatus according to claim 1, further comprising a vehicle speed detecting section for detecting a traveling speed of a vehicle, wherein said controller establishes the first receiving mode when the vehicle traveling speed detected by said vehicle speed detecting section is equal to or greater than a predetermined threshold value, and establishes the second receiving mode when the vehicle traveling speed is less than the predetermined threshold value.

3. The digital broadcast receiving apparatus according to claim 1, further comprising:

a first receiving level detecting section for detecting a receiving level of said first receiving demodulation unit; and a second receiving level detecting section for detecting a receiving level of said second receiving demodulation unit, wherein said controller establishes the first receiving mode when both the receiving levels detected by said first receiving level detecting section and second receiving level detecting section are less than a predetermined threshold value, and establishes, when one of the receiving levels is equal to or greater than the predetermined threshold value, the second receiving mode in which the receiving frequency of the receiving demodulation unit with a greater receiving level is set to the broadcasting wave frequency of said desired station, and the receiving frequency of the receiving demodulation unit with a smaller receiving level is set to the broadcasting wave frequency of said another station.

4. The digital broadcast receiving apparatus according to claim 1, wherein said controller reads error rate information of the received data from information about error correction by said second data extracting unit as to each of the demodulation signals of said first receiving demodulation unit and second receiving demodulation unit, which is acquired by said second signal selecting section; establishes the first receiving mode when both the read error rate information items exceed a predetermined threshold value; and establishes, when one of the read error rate information items is less than the predetermined threshold value, the second receiving mode which sets the receiving frequency of the receiving demodulation unit with the error rate less than the predetermined threshold value to the broadcasting wave frequency of said desired station, and sets the receiving frequency of the other receiving demodulation unit to the broadcasting wave frequency of said another station.

5. The digital broadcast receiving apparatus according to claim 1, further comprising a memory section for recording or updating program-related information of said desired station output from said first data extracting unit, and program-related information data of said another station output from said second data extracting unit, wherein said controller establishes the second receiving mode in accordance with a remaining recording amount of said memory section after deleting program-related information data recorded previously, acquires the program-related information from each of said first data extracting unit and second data extracting unit to update the record of said memory section.

* * * * *